United States Patent [19]
Bannister et al.

[11] Patent Number: 6,097,968
[45] Date of Patent: *Aug. 1, 2000

[54] METHOD AND APPARATUS FOR ROUTING CALLS TO A LOW POWER PORTABLE

[75] Inventors: Cecil Bannister; Raju Iyer; Kishore Raj, all of Plano; Richard Mo, Dallas; Paul S. Meche, Richardson, all of Tex.; Sorin Cohn, Kanata, Canada

[73] Assignee: Nortel Networks Corporation, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/785,704

[22] Filed: Jan. 17, 1997

Related U.S. Application Data

[60] Continuation of application No. 08/453,143, May 30, 1995, abandoned, which is a division of application No. 08/231,710, Apr. 22, 1994, Pat. No. 5,787,355.

[51] Int. Cl.[7] ........................................... H04Q 7/30
[52] U.S. Cl. .................. 455/561; 455/11.2; 455/445; 455/426
[58] Field of Search ............................ 455/11.1, 20, 426, 455/461, 552, 435, 432, 433, 445, 414, 417, 561

[56] References Cited

U.S. PATENT DOCUMENTS

| | | | |
|---|---|---|---|
| 5,093,929 | 3/1992 | Stolarczyk et al. | 455/90 X |
| 5,109,526 | 4/1992 | Reed | 455/11.1 |
| 5,315,636 | 5/1994 | Patel | 455/445 |
| 5,442,680 | 8/1995 | Schellinger et al. | 379/58 |
| 5,504,935 | 4/1996 | Vercauteren | 379/60 X |

FOREIGN PATENT DOCUMENTS

| | | |
|---|---|---|
| 462727 | 12/1991 | European Pat. Off. . |
| 0 583 233 A2 | 2/1994 | European Pat. Off. . |
| 2-266792 A | 10/1990 | Japan . |
| 5-183500 A | 7/1993 | Japan . |
| 6-13961 A | 1/1994 | Japan . |
| 7-273711 A | 10/1995 | Japan . |
| 92/04796 | 3/1992 | WIPO . |
| WO 92/12603 | 7/1992 | WIPO . |
| WO 93/16534 | 8/1993 | WIPO . |

*Primary Examiner*—William G. Trost
*Attorney, Agent, or Firm*—Foley & Lardner

[57] ABSTRACT

Radio units responsive to a paging signal seize a trunk to connect wireless calls to telephone apparatus serviced by a private branch exchange. The radio units can each respond to a different set of mobile identification numbers, or can be configured in a master-slave arrangement or can employ subaddressing. Wireless trunking to a wireless private branch exchange can also be accomplished and a system with multiple hierarchical layers can also be formed.

4 Claims, 10 Drawing Sheets

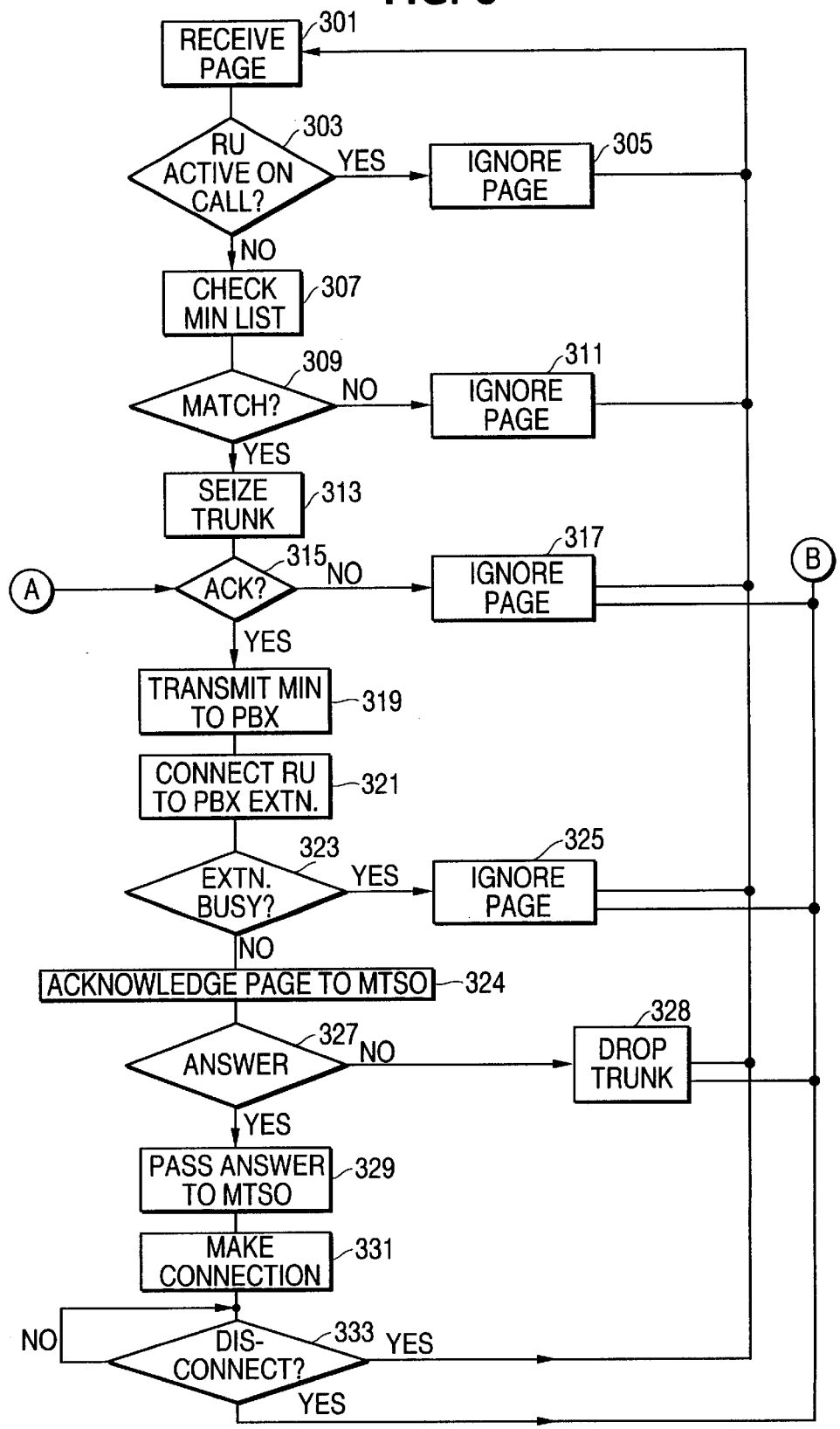

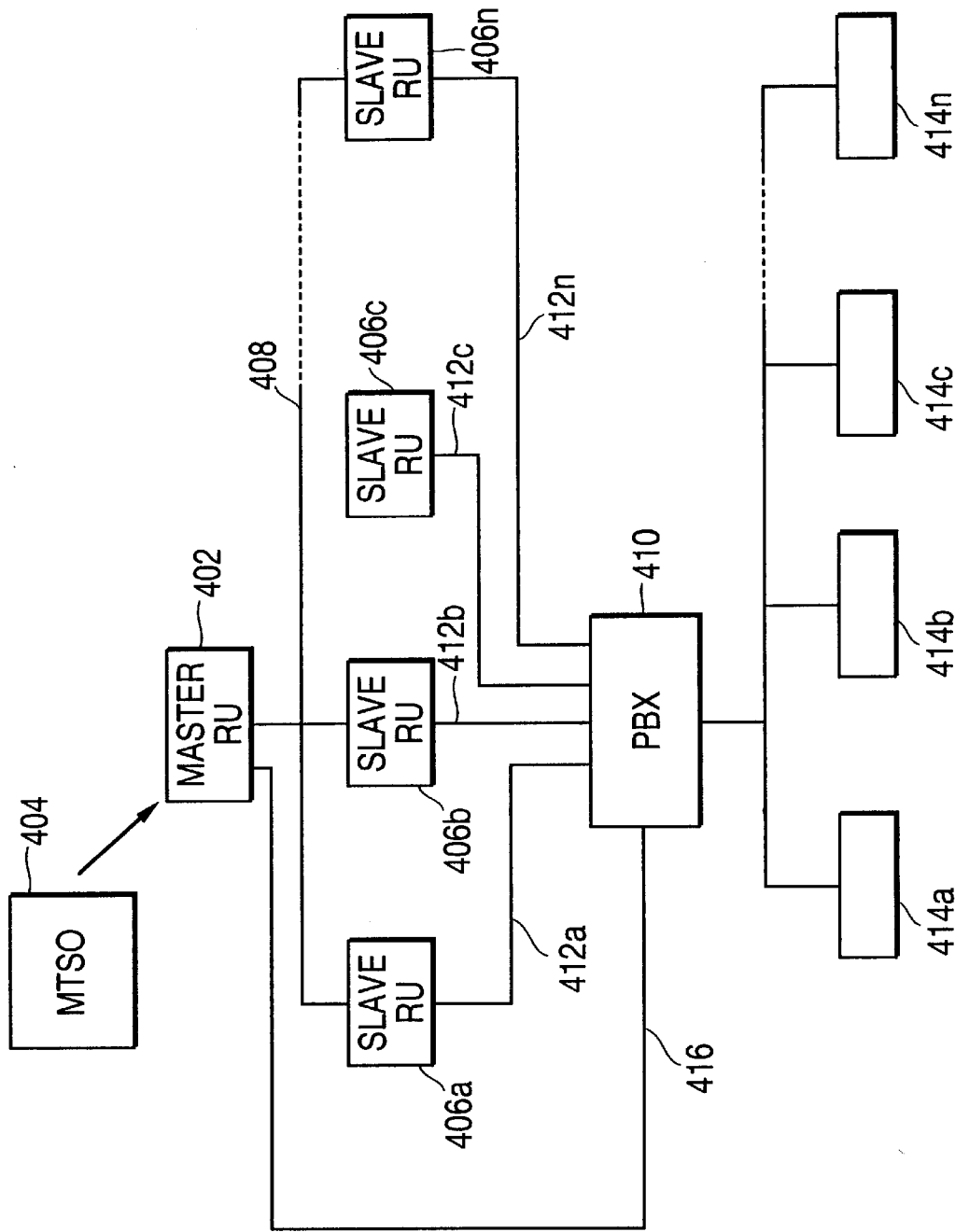

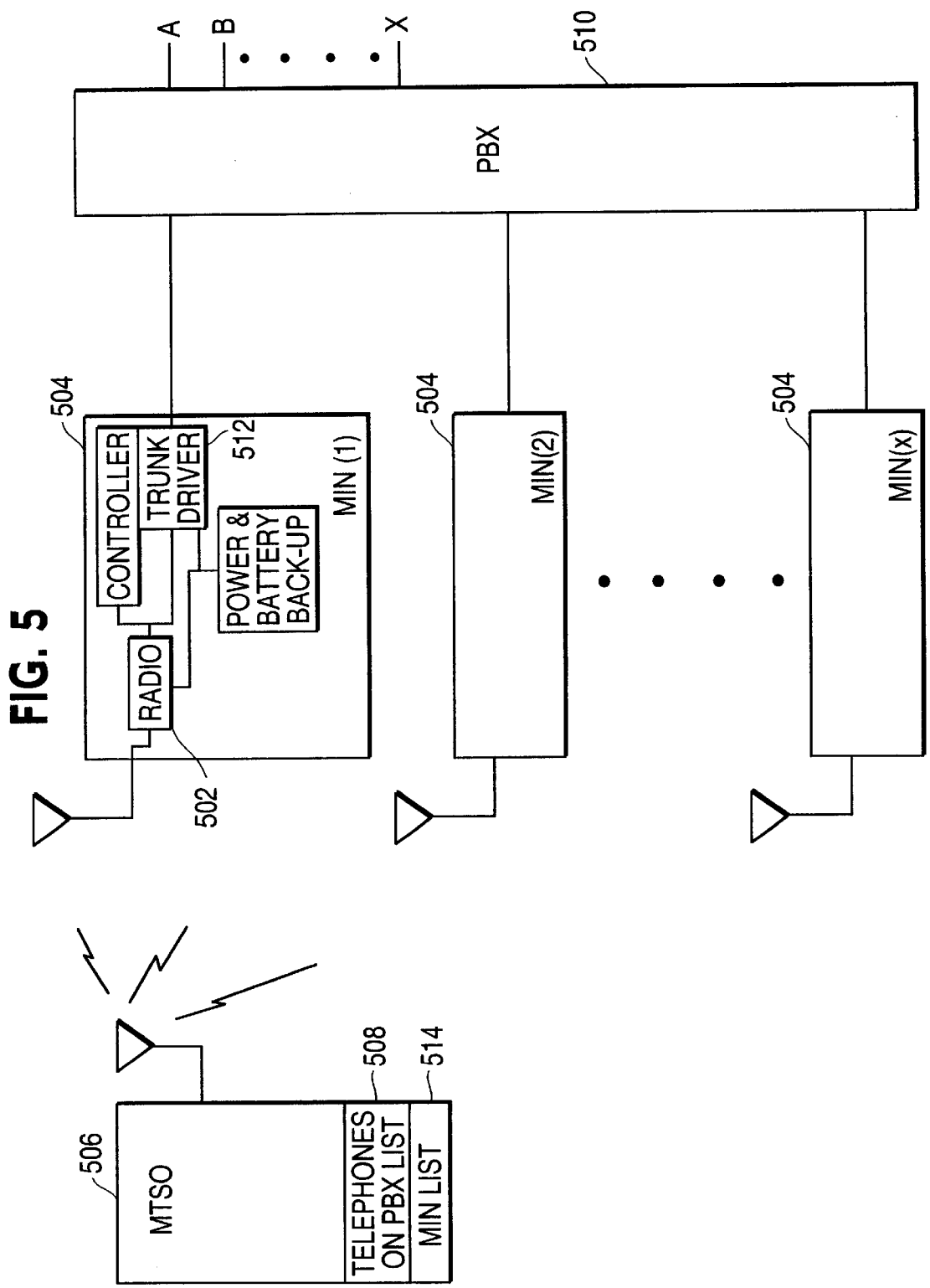

METHOD AND APPARATUS FOR ROUTING CALLS TO A LOW POWER PORTABLE

This application is a continuation of application Ser. No. 08/453,143, filed May 30, 1995, which is a division of application Ser. No. 08/231,710, filed Apr. 22, 1994.

This application is a division of application Ser. No. 08/231,710, filed Apr. 22, 1994, U.S. Pat. No. 5,787,355.

BACKGROUND OF THE INVENTION

1. Field of the Invention

The invention relates to telecommunications networks and in particular to such networks incorporating a private branch exchange (PBX).

2. Related Art

The deployment of telephone services typically requires the installation of costly copper lines from a central office (CO) to, for example, a business facility with a private branch exchange (PBX). Today, the wireless link offers a reasonable alternative to copper analog lines for single wireline phones.

Businesses often employ a private branch exchange, which is typically a manual or dial exchange connected to the public telephone network and is located on the premises of the business. A PBX, which is a switching center, typically has a trunk connection to a central office (CO), which is also a switching center. Conventional systems cannot use a wireless link between the PBX and the CO because it would be necessary for the wireless links to appear to the PBX as central office trunks with direct inward dialing (DID) capability, since wireless links do not support incoming call destination addresses.

A central office can communicate with a PBX on a direct inward dial (DID) trunk, a direct outward dial (DOD) trunk, a digital T1 trunk, or a Primary Rate Interface (PRI), which is an Integrated Services Digital Network (ISDN) trunk. Signalling between the CO and the PBX is typically accomplished by multiple frequency (MF), dual tone multiple frequency (DTMF) or dial pulse methods when using analog trunks. In digital systems, signalling is accomplished over a digital signalling channel. A trunk interface, which drives a PBX, is distinguished from a loop interface, which drives telephone sets. In a trunk interface, the CO provides a destination address and the PBX provides the ringing function. Therefore, the trunk interface can be used by many telephone sets at many destination addresses. In a typical loop circuit, all the telephone sets have the same destination address. A radio unit which provides a loop interface to a telephone connected in an RJ-11 interface has provided individual communication between a public switched telephone network (PSTN) and such telephones. Such an arrangement is not suitable for a PBX because it responds to only one phone number, i.e., there is one radio link required per telephone.

Thus, a typical PBX communicates with a central office over copper wire. Installation of such hard-wired facilities is expensive and time consuming. Especially in developing countries, such hard sired facilities take a long time to install and are subject to outage induced by natural and man-made disruptions.

In addition, the emergence of new, low power, wireless technologies has facilitated the development of in-building wireless telephone services, such as CT2, CT2Plus and DECT. Within such in-building wireless service zones, these technologies provide incoming and outgoing call service. However, a subscriber has no coverage outside such zone from these low power sets and must rely on different wireless technologies, such as cellular or GSM, outside the zones. This has the disadvantage of requiring the user to use a separate phone with a different number outside the in-building zone.

SUMMARY AND OBJECTS OF THE INVENTION

In view of the limitations and costs associated with conventional systems, it is an object of the invention to provide reliable, inexpensive communications to a PBX without the necessity of a wire link between the PBX and a central office of a telephone service provider.

It is another object of the invention to provide such a system which can be rapidly deployed and easily reconfigured, for example, to accommodate increasing traffic load.

It is a further object of the invention to provide a trunk line which communicatively connects a call received by a radio unit to a private branch exchange.

It is still another object of the invention to provide a radio to trunk interface emulating a central office to the private branch exchange.

It is a still further object of the invention to provide a system with multiple radio units which can serve the same private branch exchange.

It is another object of the invention to provide a mobile telephone switching office responsive to calls directed to the PBX to broadcast a paging signal recognizable by the appropriate radio unit.

It is still another object of the invention to provide a plurality of radio units with a floating master unit which recognizes a paging signal and directs an available slave radio unit to complete a call through a trunk connected to a PBX.

It is still another object of the invention to provide a mobile telephone switching office (MTSO) which completes a call by paging any available radio unit and includes in the paging signal a sub-address correlating the destination of the call to a station (telephone) on the PBX.

It is another object of the invention to provide wireless trunking to a wireless PBX.

It is still another object of the invention to provide a hierarchical layered network switching structure.

It is a still further object of the invention to provide a system in which a user can make and receive calls from a portable, such as a low power portable, by making use of the user's cellular service.

It is a further object of the invention to allow a user to make and receive calls on a portable outside its zone, e.g., an in-building or in-plant zone, when the portable is within range of a user's repeater unit, for example a repeater unit located in the user's automobile, the repeater unit being a cellular mobile unit providing a radio link to the MTSO and functioning as a low power base station providing a low power radio link to the portable.

As will become apparent from the disclosure herein, the above and other objects of the invention are accomplished with a communications network having a radio unit receiving and transmitting messages between a network and a private branch exchange (PBX) with a trunk line between the radio unit and the PBX. The radio unit provides an interface which emulates a CO or another PBX to the PBX. The radio units can each store in a memory therein a unique list of mobile identification numbers (MINs) to which the radio unit will respond upon receipt of a corresponding paging signal. Alternately, each radio unit can have stored therein the same list of MINs with one unit receiving the pages and directing a slave unit to become active to select a trunk to accomplish the required call connection.

In another approach according to the invention, a mobile telephone switching office selects any available radio unit and sends on a sub-address field information for call completion. A system according to the invention can be implemented to achieve wireless trunk to a wireless PBX functions and in a network with a layered hierarchy of units.

Further, according to the invention, a low power repeater containing a wireless base station connects to a PSTN via cellular service, thereby allowing the user to make and receive calls on the low power portable, if the portable is within a service proximity to the repeater unit.

BRIEF DESCRIPTION OF THE DRAWINGS

The invention will be described with particularity by reference to the drawings in which:

FIG. 3 is a flow diagram of processing according to an embodiment of the invention with different mobile identification numbers (MINs) stored in each radio unit;

FIG. 4a is a block diagram of an embodiment according to the invention including master and slave radio units;

FIG. 4b is a flow diagram of processing in an embodiment according to the invention as shown in FIG. 4a;

FIG. 5 illustrates a system according to the invention employing radio units responsive to paging signals with a sub-address;

DETAILED DESCRIPTION OF THE PREFERRED EMBODIMENTS

According to the invention, wireless links serve a PBX (or key system) in place of the wired (copper) trunks, meeting the PBX's traffic loads. For direct inward dial (DID) calls, the wireless system passes on an air link to the Radio Unit (RU) and from there to PBX, information on the called party so that an incoming call can be presented to the proper phone in the PBX. One way to accomplish this result is by making the interface between the RU and the PBX must look like a central office trunk with all its characteristics (i.e., PBX line as per LSSGR FR-NWT-000064 Bellcor specification).

Figure 1A:
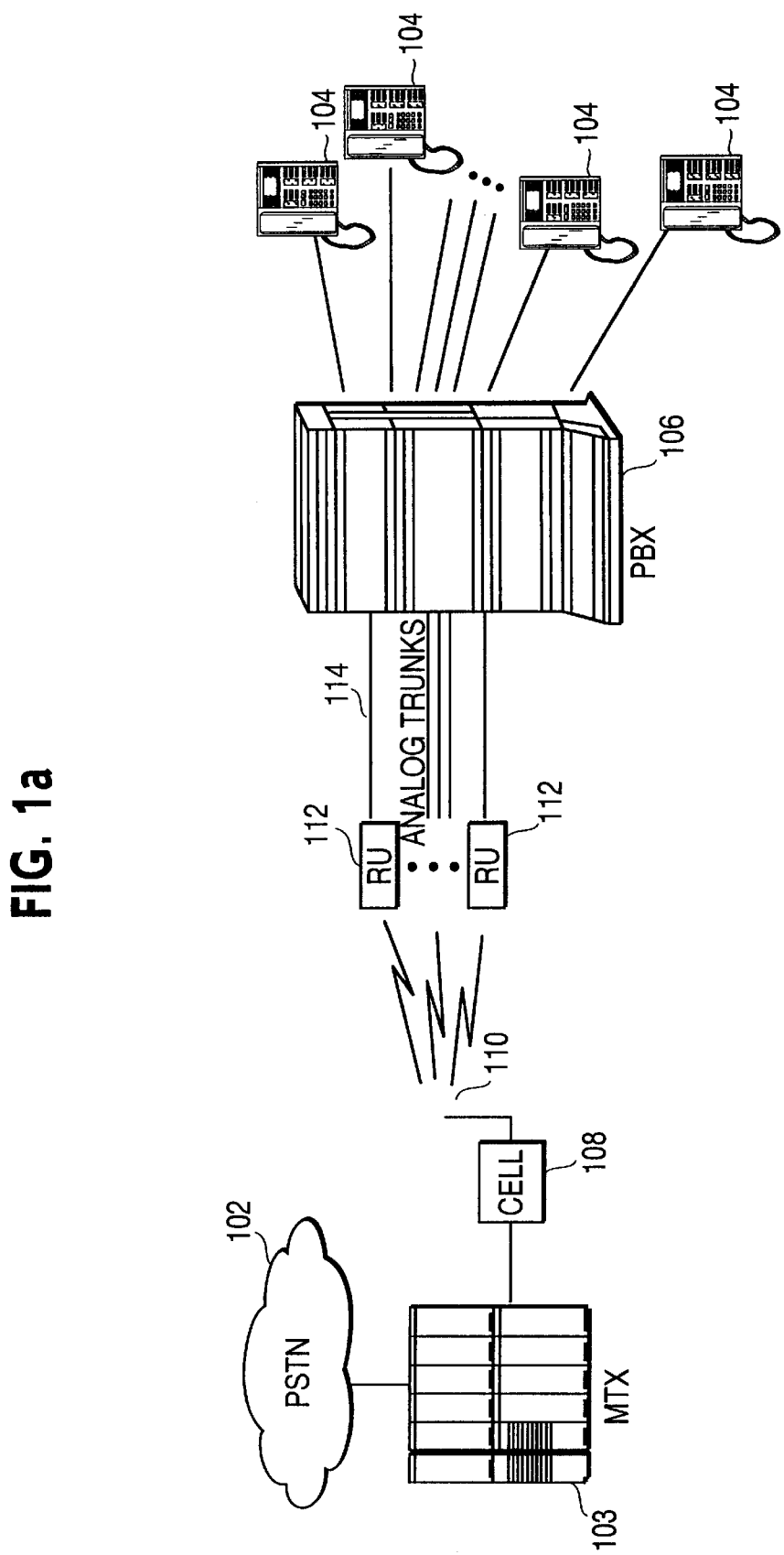
FIG. 1a is a generalized block diagram of a system according to the invention.

FIG. 1a is a generalized block diagram of an apparatus according to the invention. In FIG. 1a, a public switched telephone network (PSTN) 102 interfaces with a mobile telephone switch 103, which is typically part of a mobile telephone switching office (MTSO). Calls to and from PSTN 102 to telephones 104 connected to private branch exchange 106 are routed through cell 108. An antenna 110 associated with the cell transmits calls to and from radio units 112 which communicate through trunks 114 to PBX 106. It is these trunks 114 between radio units 112 and PBX 106 that appear to the PBX as a central office trunk. Trunks 114 can be DID/DOD loop trunk, four wire voice and signalling trunks, a T1 trunk or any other trunk. The radio units 112 can be analog, digital or any combination thereof.

As discussed further herein, a system according to the invention can be configured such that each radio unit 112 responds to a plurality of mobile identification number (MINs) or such that a master RU controls a bank of slave RUs to route a call. In a further embodiment according to the invention disclosed herein, sub-addressing capabilities of digital cellular technology are used to pass a terminal identification number (terminal ID) of the PBX.

Figure 1B:
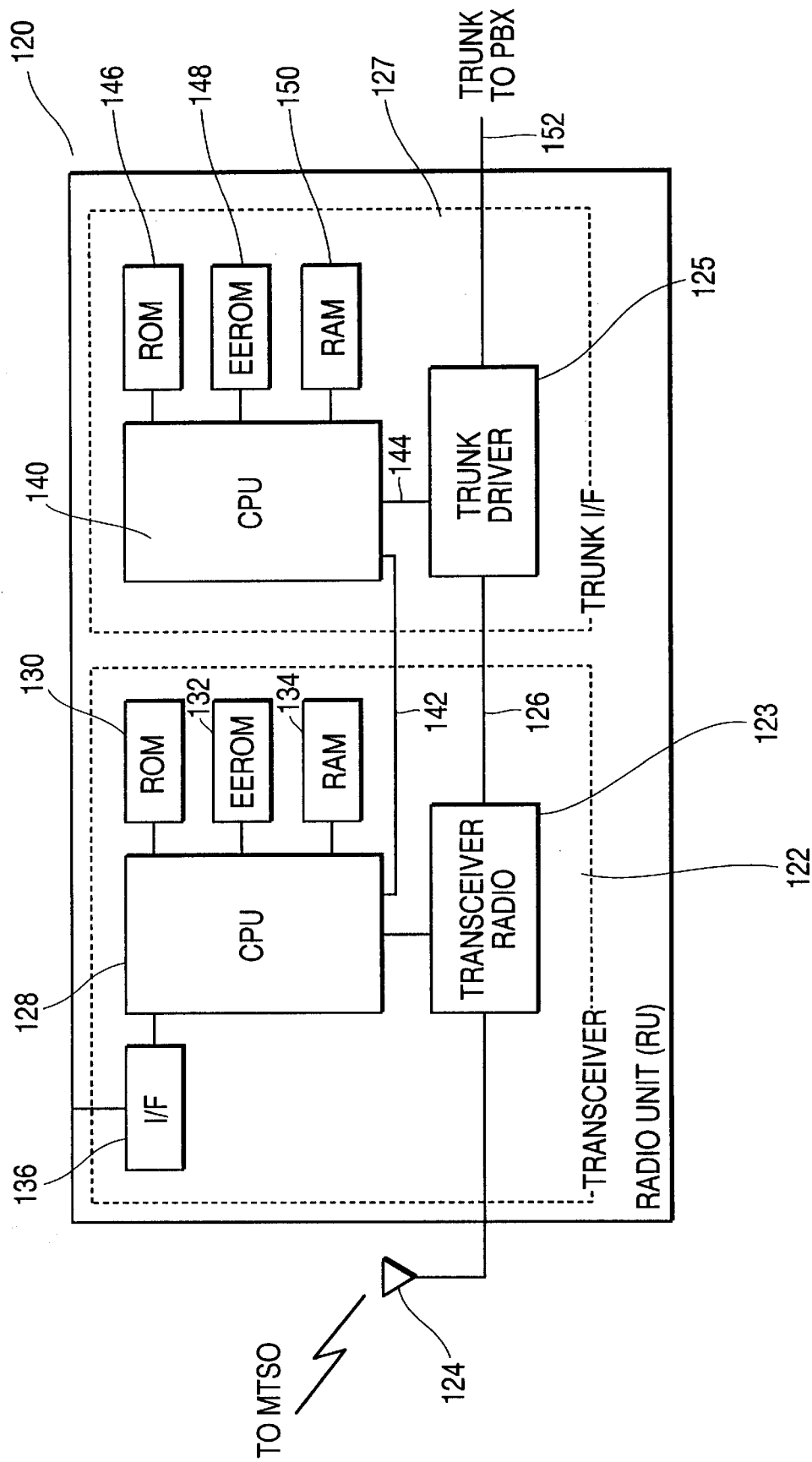
FIG. 1b is a typical radio unit according to the invention.

A typical radio unit according to the invention is shown by way of illustration and not limitation in FIG. 1b. Radio unit 120 has a transceiver portion 122 which receives and transmits RF signals through antenna 124 into and out from transceiver radio 123. Transceiver radio 123 provides voice information to trunk driver 125, which is located in trunk interface portion 127, over voice path link 126. A processor 128 in the transceiver section 122 provides control functions for the transceiver portion 122 and executes an application program to carry out protocols corresponding to the embodiments disclosed further herein. The application program is stored in ROM 130. EERAM or $E^2$PROM or other re-programmable memory 132 is used for storing information such as MIN lists or MIN to station directory number (DN) or PBX station address correlation information for use as further discussed herein. RAM 134 is used as a scratch memory by processor 128. Processor 128 has an interface 136 which can be used for downloading information such as the MINs to be stored in reprogrammable memory 132.

Radio unit 120 also has a trunk interface section 127 with CPU 140. MINs, etc. are passed between radio portion processor 128 and trunk control processor 140 over link 142. Processor 140 provides control signals over link 144 to trunk driver 125 to seize a trunk to the PBX. The exact implementation of processor 140, along with corresponding program ROM 146, EEROM 148 and scratch memory 150 along with trunk driver 125 to seize a trunk, receive an acknowledgement from the PBX, and transmit the appropriate MIN or other information to the PBX, depends on the type of trunk used, as will be known to those of ordinary skill in the art. It should also be noted that trunk 152 could also be used to download MINs and other information under control of processors 128 and 140.

Figure 2:
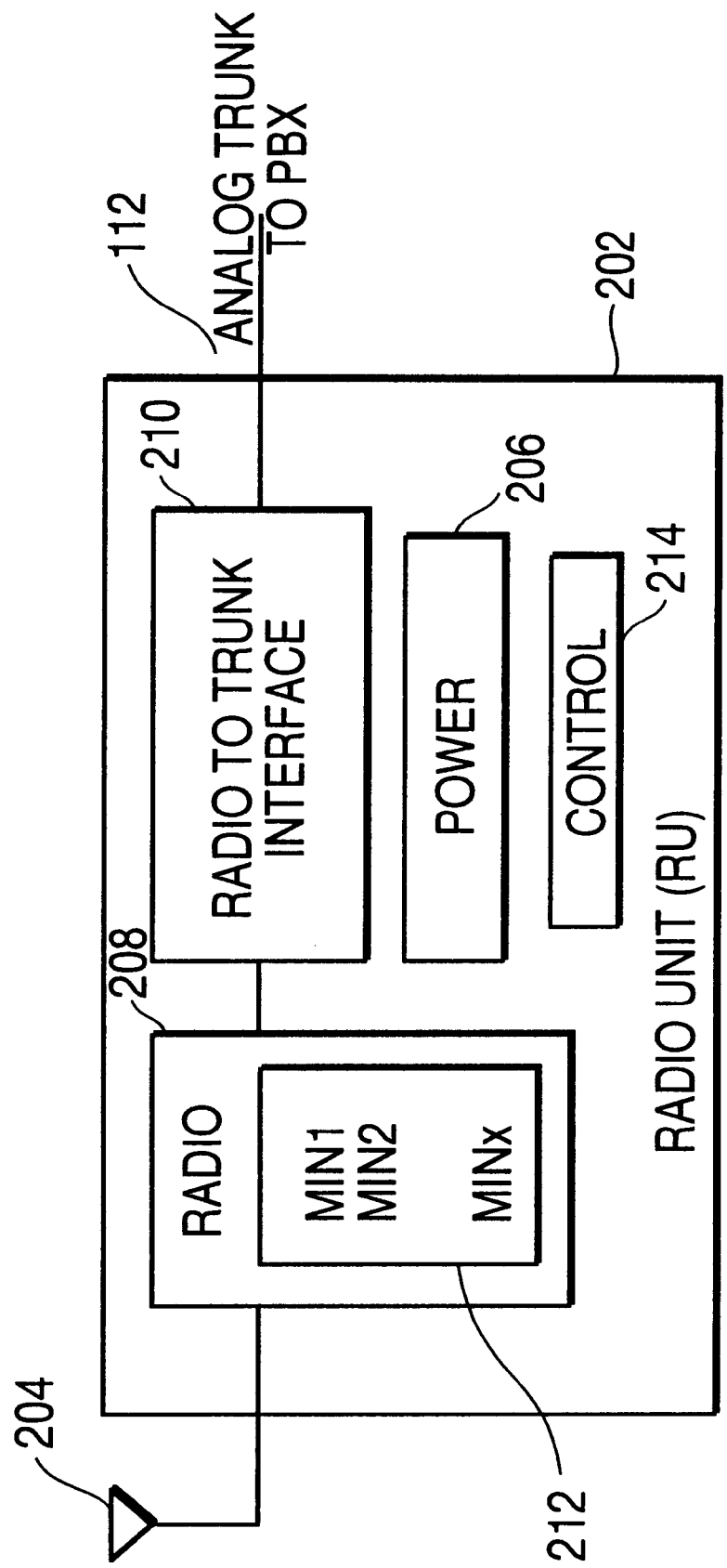
FIG. 2 illustrates a radio unit (RU) having a memory storing a plurality of mobile identification numbers which the RU recognizes.

In one embodiment according to the invention, each radio unit includes a memory having stored therein a plurality of mobile identification numbers (MINs) to which that particular RU will respond. Such an RU is illustrated in RU 202 in FIG. 2. The RU 202 includes antenna 204, a power circuit 206 and a radio receiver unit 208 which receives signals from antenna 204. The output of radio receiver 208 is routed to a radio to trunk interface circuit 210, which formats call information for transmission over analog trunk 112 to the PBX. RU 202 also includes memory 212 and radio unit control circuitry 214. In FIG. 2, memory 212 is shown as part of radio receiver 208 by way of illustration and not limitation, as those of ordinary skill will recognize that memory 212 need only be a part of radio unit 202.

In this configuration, DID calls can be received only by extensions whose number are in the MIN list stored in memory 212 of a particular RU 202 or that map to the stored MINs through translations at the PBX 106. Outgoing calls can be originated from any PBX extension 104 that has the service enabled at the PBX 106.

When a call is directed from PSTN 102 to an extension serviced by PBX 106, a processor in a MTSO directs a transmitter to broadcast a paging signal including the called MIN. In an optional configuration, the MTSO can execute pre-processing to verify that the called MIN is valid and/or is serviced by the network. In this case, the PBX selects a free trunk corresponding to a free radio unit.

The radio 208 in the RU responds to the page if the paged MIN is in its MIN list stored in memory 212. The radio 208 informs the RU's interface circuit 210 of the incoming call and passes the MIN to it. The interface circuitry executes a seizure request on the trunk 114 to the PBX 106, and passes the MIN to PBX 106 following an acknowledgement from PBX 106 of the seizure. PBX 106 rings the extension 104 associated with the MIN by using the last four digits of the MIN or through a translation table stored therein, which maps the MIN to a particular extension.

FIG. 3 illustrates the sequence of steps performed at the radio unit 202. A broadcast page received in step 301 is processed if the RU is not already processing a call, as indicated in step 303. If RU 202 is occupied with a call of that MIN, the page is ignored in step 305 and a busy treatment routine may be executed. Busy treatment may include responding with a busy signal or voice mail. If RU 202 is available, the received MIN is compared against the stored entries in the MIN list in step 307. When no match is found in step 309, the RU ignores this MIN in step 311. If the received MIN matches a MIN in the list, the interface circuitry 210 in RU 202 requests seizure of an analog trunk in step 313. If an acknowledge signal is not received in step 315, the page is ignored in step 317. Block 317 and blocks 325, 328, and 333 in FIG. 3 show two possible outcomes. In one case, control is returned to block 301 to receive another page. In the second case a master unit as discussed further herein, is used and control is returned to the receive a page at the master unit.

In either case, when an acknowledge signal indicating trunk seizure is received in step 315, the radio unit acknowledges the page and the MIN is transmitted to PBX 106, as shown in step 319. In step 321, the PBX 106 performs any translation necessary to connect the incoming call to the PBX extension corresponding to the received MIN. If the extension is busy in step 323, the RU gets a busy signal from the PBX and ignores the page in step 325. If the extension is not busy, in step 324 the page is acknowledged to the MTSO. If no answer is received in step 327, in step 328 the trunk is dropped. If an answer is received, in step 329 the answer is passed to the MTSO and, in step 331, the connection is made. In step 333, disconnection activity is monitored until disconnection occurs.

In the case of an outgoing call from PBX 106, the PBX requests seizure of a trunk 114, and sends the dialed number to an RU interface circuit 210 following the acknowledgement of the seizure request. The interface circuit 210 commands the radio 208 to establish a radio link and voice path with the MTSO and passes the number dialed. The call proceeds from here as any call initiated by a cellular radio. If there is only one RU serving the PBX 106, the extension originating the outgoing call will receive a reorder tone provided by the PBX, if the trunk (and RU) is busy. In a multiple RU configuration, PBX 106 will find an available (free) trunk to place the outgoing call by executing one of several known trunk searching algorithms supported by the PBX for this purpose. Thus, an outgoing call from the PBX 106 can be arranged through any available RU.

Memory 212 stores a list of mobile identification numbers. Multiple RUs can serve the same PBX, with each RU having its own, typically unique list of MINS. While there is no theoretical limit to the number of MINs that can be serviced by an RU, it should be recognized that an RU can service only one call at a time. Since calls to other MINs serviced by an RU are blocked when that particular RU is busy, there is a practical limit on the number of MINs that can be serviced by an RU before call blocking becomes a significant problem.

Such blocking can be avoided by a further embodiment according to the invention employing a bank of RUs. Each RU has stored in a memory therein an identical list of MINs which can be serviced by any of the RUs. However, at any one time only one of the RUs in the bank of RUs acts as a Master RU by monitoring the paging signals with a valid MIN from an MTSO. As discussed further herein, any of the RUs can be the master RU depending upon which of the RUs is busy. Thus, the identity of the master RU may change over time, resulting in a "floating" master.

To a user, a system according to the invention with a bank of RUs is similar to that shown in FIG. 1a. However, only one of the RUs 112 is the master. The remaining RUs function as slaves to the master RU. Each RU has circuit configuration similar to that shown in FIGS. 1b and 2. The primary difference is the processing performed in the RU by control circuitry 214. According to this aspect of the invention, control circuitry 214 first detects if an RU is the master RU. Only if the RU is the master does the control circuitry monitor the received paging signals by comparing the received MIN to the MINS stored in memory 212, which are the same for all RUs in the bank of RUs.

When a valid MIN is paged, the master RU commands a free slave RU to respond to the valid MIN being paged. The slave RU immediately originates the call to the PBX on the associated analog trunk and passes the MIN number to the PBX and then responds to the MTSO page, if the station is not busy. A group of continuous directory numbers (DNs) or MINs at the MTSO may be assigned to the PBX (e.g., the same first three digits are shared), whereby the last four digits correspond to the PBX extension. This eliminates the need for translation at the PBX.

A hierarchical, functional block diagram of a system according to the invention with master and slave RUs is shown in FIG. 4a. On an incoming call, the master RU 402, after receiving a valid MIN page from MTSO 404, commands a free slave RU, e.g., 406a, through a control link 408 to present the incoming call to the PBX 410 and pass the MIN to the PBX on the trunk 412a and to respond to the MTSO page, if the station is not busy. The PBX 410 in turn, delivers the call to the corresponding wireline extension, e.g., 414c, that matches the last four digits.

A potential for call blocking occurs when all the slave RUs 406a, 406b, 406c . . . 405n are busy. To eliminate this problem master RU 402 itself completes the call connection to PBX 410 on trunk 416, thus becoming a slave RU. The first RU to emerge from the busy state then becomes the master RU. This is possible because each of the RUs has stored in a memory therein the entire list of MINs serviced by the PBX.

In the case where the PBX 410 requires a larger number of trunks, the output of the RUs 406a . . . 406n can be consolidated into a T1 trunk.

Figure 4B:
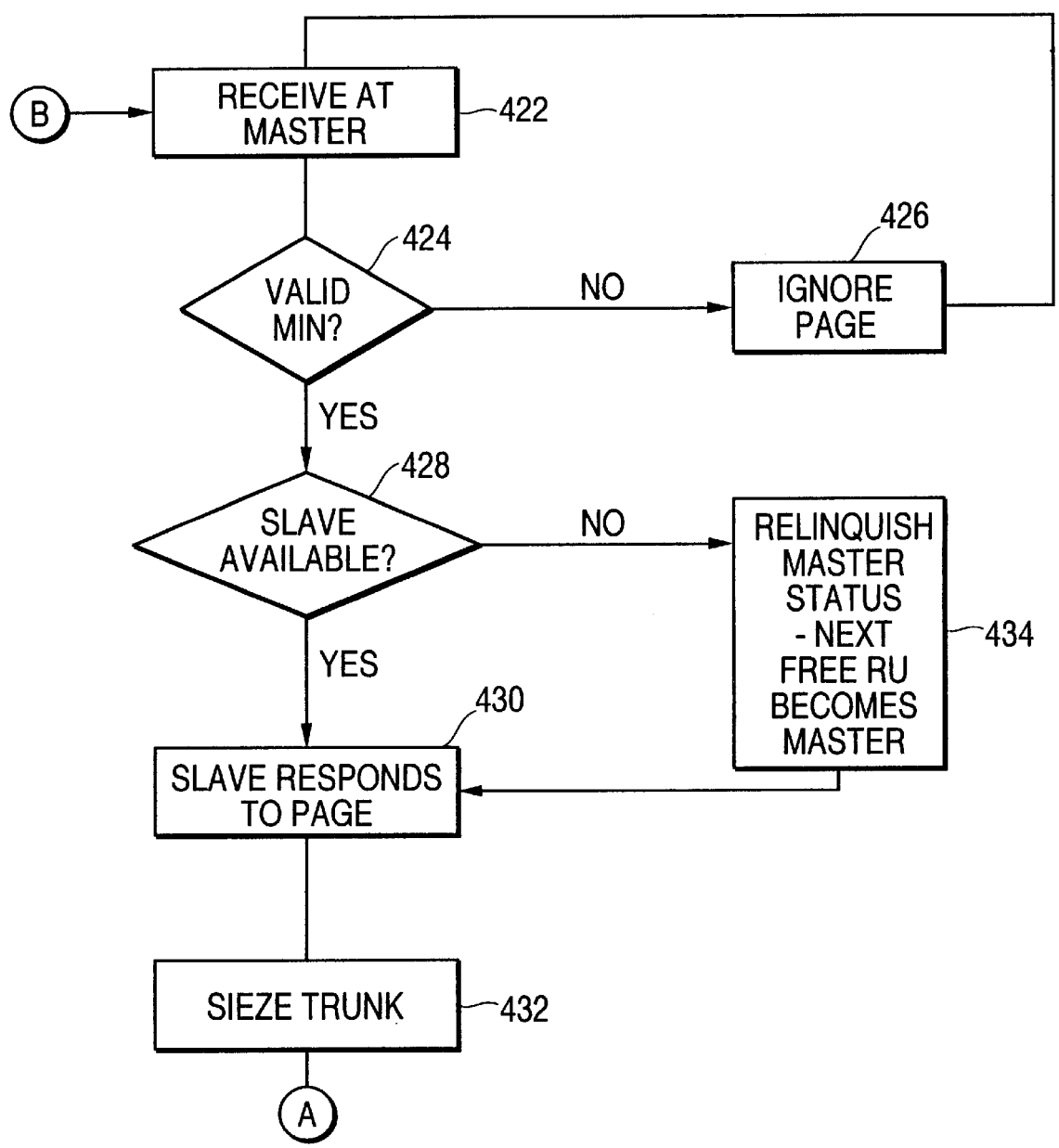

The sequence of steps is shown in FIG. 4b. In step 422 a page is received at the master RU. In step 424, the validity of the paged MIN is verified and the page is ignored at step 426 if the MIN is invalid. As shown in step 428, when a valid MIN has been received, the master RU conducts processing, for example, polling the remaining RUs, to determine if a slave RU is available to receive the call from the MTSO. If so, the master RU instructs the slave RU in step 430 to seize a trunk, as shown in step 432. Processing then proceeds as previously described with respect to FIG. 3. If in step 428 the master determines a slave RU is not available, in step 434 the master RU relinquishes its master status, becomes a slave RU and completes the current call. The next free RU becomes the master, thus providing a "floating master."

The master RU can also relinquish its master status to complete an outgoing call from an extension in the PBX. An RU looks to the PBX 410 like a central office (CO) trunk, so when the PBX 410 seizes a free trunk, the associated RU collects the dialed number sent by the PBX. The RU will then attempt to connect the call to the MTSO 404. If the seized trunk corresponds to the master RU at that moment, then the RU will relinquish the master role to a free RU, if there is one available. If the seized trunk corresponds to a slave RU, then the call proceeds as normal.

Between the time when a master RU becomes a slave RU and when a slave RU becomes available to be the master RU, calls to the PBX are blocked. This condition can be identified to the caller by an appropriate procedure in the MTSO. For example, a timer in MTSO 404 could provide busy processing, e.g., transmission of a busy signal or activation of another busy protocol to the incoming caller, if a call is not completed within a predetermined time. A similar procedure could be implemented in the PBX for outgoing calls. Alternatively, trunk availability could be monitored in the PBX and an outgoing caller can be signaled that no trunks are available.

Thus, according to the invention, if all slave RUs are busy when an incoming call is received or an outgoing call is attempted in the remaining free trunk, the master RU relinquishes the master role and takes the incoming call or makes an outgoing call. In the absence of a master, the first RU that becomes free takes the role of master, and the process continues.

If a called extension is busy, then the PBX 410 will provide a busy tone to the radio unit and the MTSO with the appropriate action as previously described herein.

This implementation according to the invention, where each RU has a copy of the MIN list, also provides an increased level of robustness whereby a RU that becomes inoperative will not affect the operation of the RUs bank. As a result, this implementation with an RU bank makes use of the facilities and resources in an effective way, optimized for traffic.

FIG. 5 illustrates an embodiment according to the invention with sub-addressing. A radio portion 502 of each of the digital cellular RUs 504, as shown in FIG. 5, has a unique MIN, e.g., MIN(1), MIN(2) . . . MIN(X). When a radio 502 recognizes a paging signal with its MIN, it acknowledges the MTSO. The RU 502 passes information on a sub-address of the page as stored in the MTSO telephone list 508 to the PBX 510 through interface circuitry, such as trunk driver 512. This sub-address contains the PBX terminal ID, e.g., A, B, . . . X, as shown in FIG. 5.

On an incoming call the MTSO "hunts" for a free MIN associated with the target PBX as identified in a MIN list 514 stored in a memory in MTSO 506. Using this approach it is only necessary to store as many MINS as there are RUs in the system. RUs can be added as traffic demands increase without affecting operation or performance. Thus, the embodiment in FIG. 5 optimizes utilization of resources in a non-blocking fashion.

In order to process an incoming call according to this aspect of the invention, the RU MINs associated with a PBX are configured into a HUNT group at the MTSO 506 and stored in a memory therein as MIN list 514. A hunt group is a mechanism to select a free MIN from a group of MINs associated with a PBX. All MINs associated with a PBX are in a related group known to the MTX, which can complete a call to any of the MINs using a round robin, random, bottom up, or other suitable approach. Upon receipt of an incoming call, any free MIN (thus an RU) from the "hunt" group is chosen by the MTSO to deliver the incoming call. The MTSO generates a paging signal to the RU with the selected MIN. The paging signal includes the direct inward dial directory number (DID DN) in its sub-address. The radio in the RU with the corresponding MIN responds to the page after it passes the sub-address information to the interface circuitry, such as a trunk driver 512. The interface circuitry in turn originates a trunk seizure request to the PBX 510. The interface circuitry passes the sub-address information (DID DN) to the PBX upon receiving an acknowledgment of the seizure request. The PBX then uses the last four digits of the DID DN to ring the corresponding extension, A, B, . . . X. The PBX 510 signals a busy tone to the RU for it to ignore the page from the MTSO if the extension is busy, and provide appropriate call treatment.

In any of the embodiments described above, call restrictions for outgoing calls can still be exercised by the PBX on a per caller (wireline set) basis. Calls within the customer group stay within the PBX without using wireless resources (radio channels). In addition, as PBX traffic increases, growth can be handled smoothly by adding RUs to the system without impacting functionality, on a per need basis.

Figure 6:
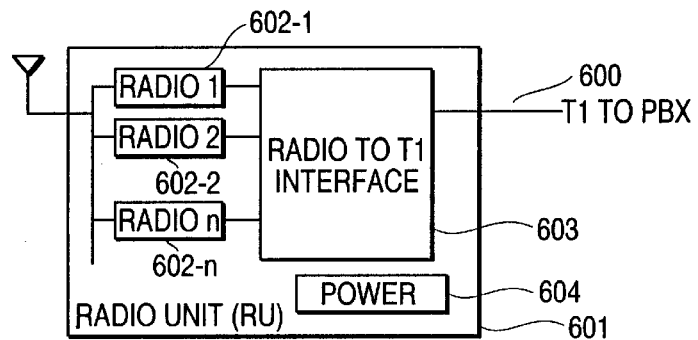
FIG. 6 illustrates a radio unit with multiple radio portions and an interface circuit having a radio to T1 interface.

Moreover, in any of the embodiments described above, the analog trunks to the PBX can be replaced by a T1 digital interface 600. As shown in FIG. 6, radio unit 601 has n radio portions, 602-1 . . . 602-n, with each radio portion communicatively connected to interface circuitry 603 in the form of a radio to T1 interface. In the embodiment with sub-addresses, each digital radio portion 602-1 . . . 602-n of the RU 601 has its own MIN belonging to the "hunt" group at the MTSO. The radio portion passes the DID DN in the sub-address to the interface circuit 603 which seizes a free channel in the T1 interface to the PBX and places the call.

In analog cellular radios, the interface circuitry owns the MIN list. It designates which radio is the master to listen to the pages and give the slave units the MIN when a response to a page is needed.

A system according to the invention is also applicable to provide wireless trunking to a wireless PBX. Low power wireless services, such as the CT-2 based Companion™ system by Northern Telecom, offer an attractive option for businesses with employees who frequently move around between, for example, manufacturing, storage and wholesale facilities, where cellular service is absent. In many such locations access to the PSTN is impossible and cost prohibitive. In a system according to the invention, cellular transceivers or radio units provide information about a called party to a controller of a low power wireless service, e.g., a Companion™ Controller (CC), through a digital link, such as a serial digital link. This allows the low power wireless service controller to deliver an incoming call to the appropriate CT2 wireless set, thereby providing the CT2 set with unprecedented access to the PSTN. Such a system according to the invention is particularly useful where the low power wireless service handles a large amount of traffic or where rapid system development is required.

Figure 7:
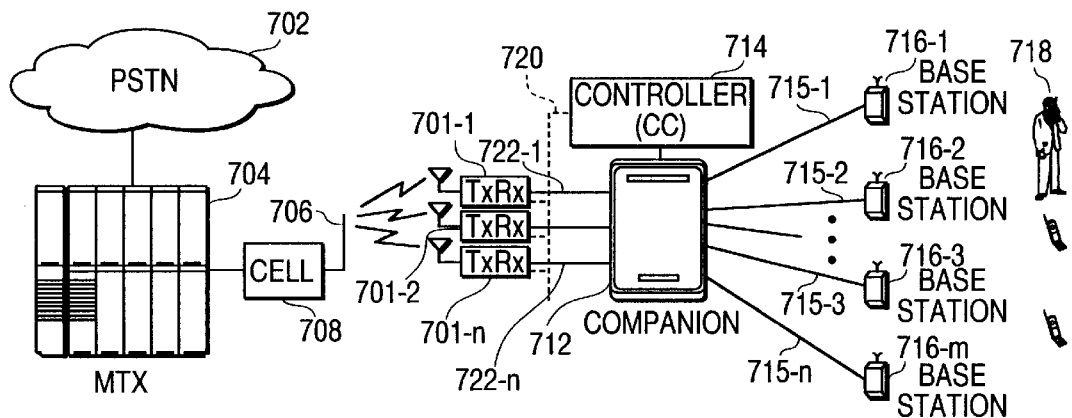
FIG. 7 illustrates a wireless trunk to wireless PBX system according to the invention.

FIG. 7 illustrates a system according to the invention for wireless trunking to wireless PBXs. PSTN 702 is connected to mobile telephone switch (MTX) 704 which transmits calls through antenna 706 through cell 708. A number of cellular radio units ($T_xR_x$) 710-1 . . . 701-n serve a low power wireless system such as the Companion™ system 712 controller by Companions™ controller 714. The Companion™ system is communicative coupled, for example, by wires 715-1 . . . 715-n to base stations 716-1 . . . 716-m. The base stations provide wireless communication links to portable units 718.

The number of cellular radio units 701-1 . . . 701-n that serve the Companion 712 can be significantly smaller than the number of Companion™ portable handsets thus reducing the overall system cost. The number of radio units required is a function of the system traffic to the PSTN, which is typically about 15% of the number of portables for a business environment.

The radio units in a system for wireless trunking to a wireless PBX according to the invention can be configured to operate according to any of the embodiments previously discussed herein. Thus, RUs 701-1 . . . 702-n can each be responsive to a separate list of MINs, the RUs can be configured to operate in a master-slave configuration with a floating master, or can use sub-addresses with a hunt group, all as previously disclosed herein.

In a particular example, the control link 720 between RUs 701-1 . . . 701-n allows one of the RUs acting as a master RU to instruct others of the RUs acting as slave RUs to respond to a specific DID call. The master RU, who always listens to the signalling channel, instructs a free slave RU to take the call when the number paged matches an entry in a master RU list stored in a memory in each RU. The number paged, together with the selected RU, using the corresponding line 722-1 . . . 722-n to the Companion™, is also delivered to the CC via link 720 the Companion™ 712 to be instructed to complete the call to he corresponding wireless set 718. When all slave RUs re busy, the master RU then relinquishes the master role and takes the incoming, or makes an outgoing, call. The first RU that next becomes free then assumes the role of master, and the process continues, assuming that all RUs have a copy of the DN list. Typically, the list of DID DNs is loaded to the RUs 701-1 . . . 701-n by the CC 714 from a subscriber profile, in which the DID DN is mapped to the CT2 wireless set phone identification number (PIN).

Where the Companions 712 requires a larger number of trunks, the output of the RUs can be consolidated into a T1 link, for example as shown in FIG. 6.

The RU looks like a central office (CO) analog line to the Companion™ 712 so that, when the Companion™ 712 seizes a free line 722-1 . . . 722-n, the RU collects the dialed digits after providing a dial tone. The corresponding RU will then attempt to connect the call to the MTSO.

Figure 8:
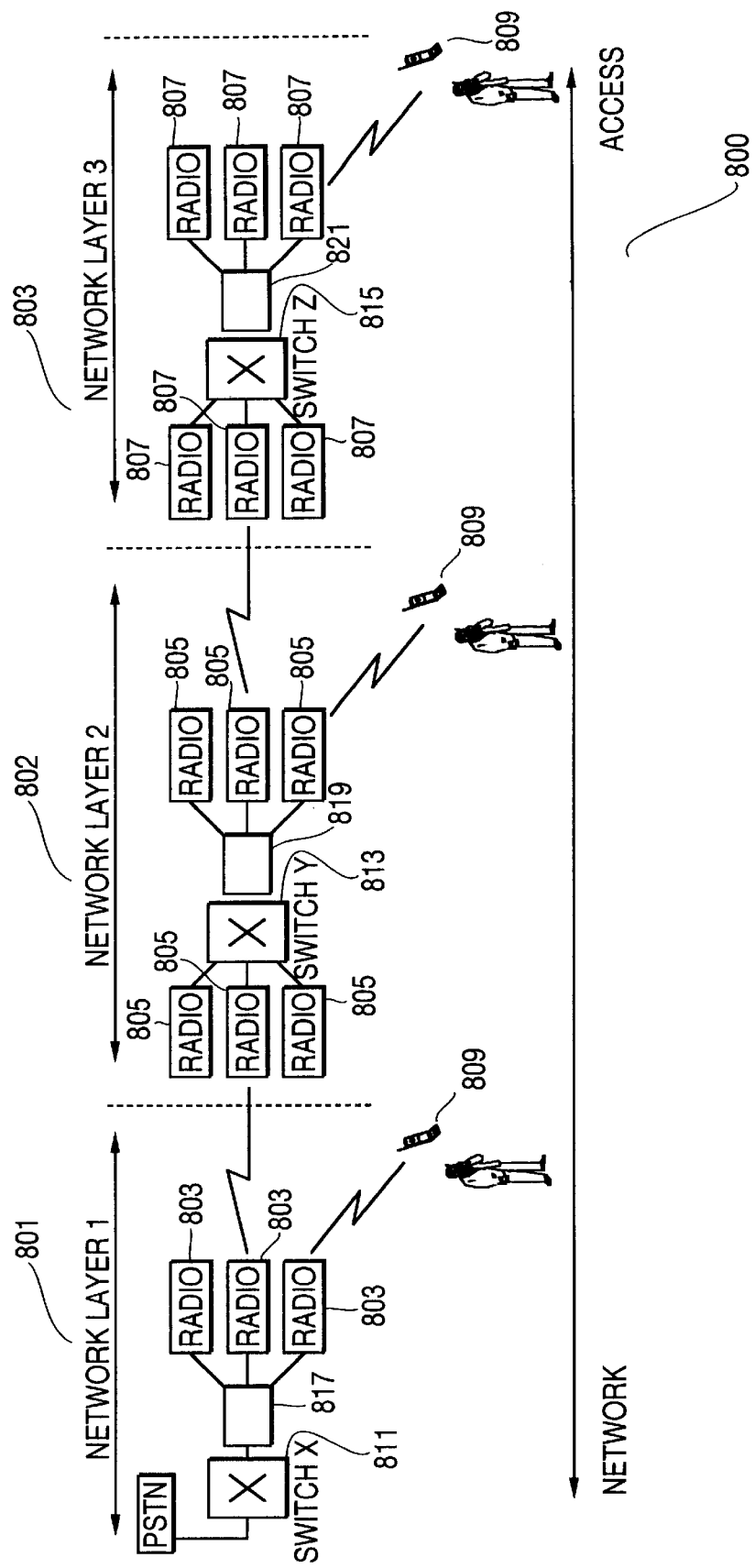
FIG. 8 illustrates a layered network hierarchical system according to the invention.

A system according to the invention also encompasses a distributed multilayer switching network hierarchy 800 as illustrated in FIG. 8. FIG. 8 illustrates three layers 801, 802, 803. Each network layer can be separately configured so that it is not necessary for all the network layers to use the same type of radio units. For example, layer 801 could have radio units 803 operating based on different MIN lists in each unit, layer 802 could employ RUs 805 using a master-slave RU approach and layer 803 could use RUs 807 with a hunt group and sub-addresses. Any other combination of such approaches among layers could also be used. In some cases, it may also be possible to mix radio unit types within a network layer.

In a multilayer network according to the invention, each network layer supports individual portables 809 or another layer in the hierarchy. Each layer would include a switch, e.g., 811, 813, 815 and concentrator 817, 819, 821 to off load the preceding upper layer.

New wireless access technologies are becoming available to meet specific customer needs and applications. In general, each of these technologies has specific characteristics that makes it suitable for different and unique environments and application. The hierarchical architecture for wireless switching systems according to the invention permits exploiting wireless concentrator characteristic of each of these wireless system offering a multiple radio system.

A system according to the invention has been disclosed for use with conventional PBX trunks. However, a system according to the invention is not limited to such conventional PBX trunks and can be applied to other signalling interfaces between a radio unit and a PBX. For example, any signalling protocol that enhances specific features of the system could be employed with the invention.

Figure 9:
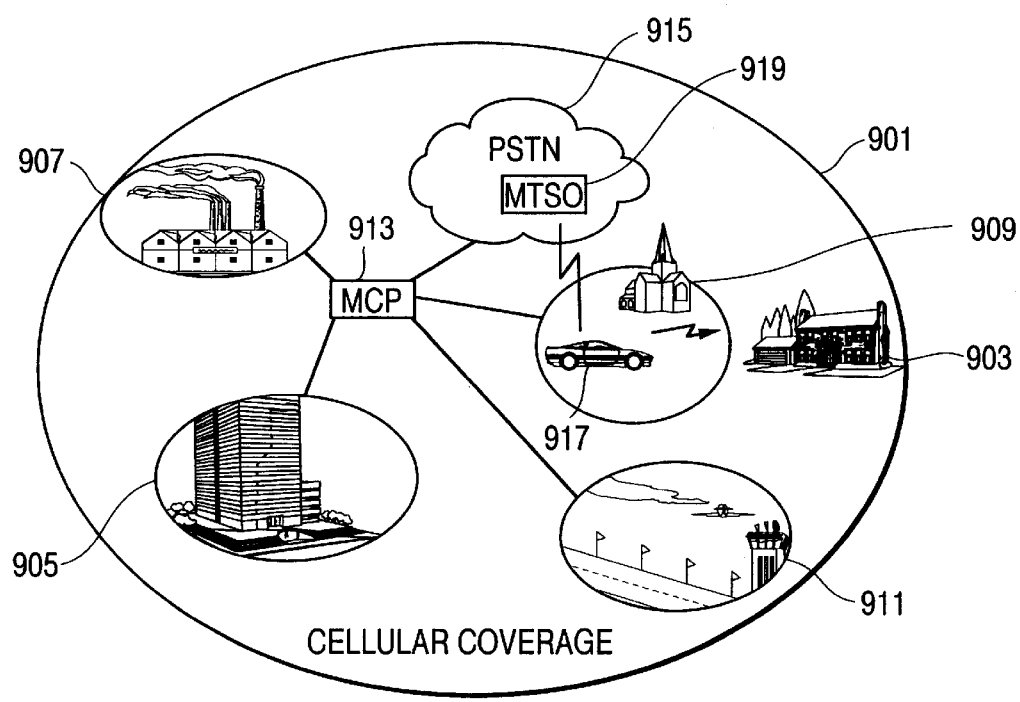
FIG. 9 illustrates a system which allows a subscriber to make and receive calls outside fixed zones using the same portable, in a mobile zone.

FIG. 9 illustrates a system which takes advantage of cellular coverage to allow a low power portable to make and receive calls in a mobile low power cell while outside the fixed zone. FIG. 9 shows a zone of cellular coverage 901. Within zone 901 are several fixed zones, such as home 903, office building 905, factory 907, church 909 and airport 911 covered by low power wireless service, together with a mobile zone (vehicular) 909 served by a mobile repeater unit. Mobility control point (MCP) 913 allows a user to roam between these zones of coverage and make and receive calls while in the zones. Routing of an incoming call from PSTN 915 is accomplished by registering the low power portable in the zone where it is present or by any other suitable method. Control and routing functions of the mobility control point are performed by a conventional processor or other circuitry, not shown. Outgoing calls can also be routed to the PSTN as previously described herein.

When a portable is not present or registered in one of the low power service zones, MCP 913 presents the call to the repeater unit in car 917 via the cellular service through the mobile telephone switching office (MTSO) 919. In turn, the repeater unit presents the call to the low power portable. The portable rings if the portable is within coverage of the repeater unit, e.g., in the car, and is registered with the base station in the repeater unit. Alternately, MCP 913 may be informed by the repeater unit that the low power portable is registered in the repeater unit and route an incoming call to the repeater unit.

For outgoing calls, when the low power radio channel is seized and the digits passed to the repeater, the repeater then passes the digits to the MTSO and seizes the channel. In some low power technologies, where dial tone is required, the dial tone can be provided by the repeater.

As a result, a user can make and receive calls from a low power portable outside a fixed zone providing the low power service, provided the portable is within range of a base station of a repeater, such as one in the user's car. The user need not actually be in the car, but may be outside the car or in a building near the car.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A mobile repeater unit comprising:
   a cellular mobile unit providing a direct radio link from a low power portable to a mobile telephone switching office; and
   a low power base station providing a low power radio link to the low power portable located outside a fixed service zone;
   said mobile repeater unit having a movable service zone associated therewith, said mobile repeater unit being responsive to complete a connection between said low power portable and said mobile telephone switching office when said low power portable is located outside the fixed service zone but is located within said movable service zone.

2. A mobile repeater unit as recited in claim 1, wherein said mobile telephone switching office provides a link to a switched telephone network.

3. A mobile repeater unit as recited in claim 2, wherein said base station includes a registration of said low power portable, said mobile repeater unit being responsive to said registration to service said low power portable by connecting to said switched telephone network through said mobile telephone switching office.

4. A mobile repeater unit as recited in claim 1, wherein said base station includes a registration of said low power portable, said mobile repeater unit being responsive to said registration to inform a mobility control point to route calls between said low power portable and said mobile telephone switching office through said mobile repeater unit.

* * * * *